(12) United States Patent
Qi et al.

(10) Patent No.: US 12,244,219 B2
(45) Date of Patent: Mar. 4, 2025

(54) CASCADE CIRCUIT, CONTROL METHOD AND INTEGRATED CIRCUIT THEREOF

(71) Applicant: Silergy Semiconductor Technology (Hangzhou) LTD, Hangzhou (CN)

(72) Inventors: Yu Qi, Hangzhou (CN); Wei Chen, Hangzhou (CN); Chen Zhao, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 332 days.

(21) Appl. No.: 17/968,946

(22) Filed: Oct. 19, 2022

(65) Prior Publication Data
US 2023/0125514 A1    Apr. 27, 2023

(30) Foreign Application Priority Data

Oct. 26, 2021    (CN) .......................... 202111250658.4

(51) Int. Cl.
*H02M 7/49* (2007.01)
*H02M 1/00* (2006.01)

(52) U.S. Cl.
CPC ......... *H02M 1/007* (2021.05); *H02M 1/0043* (2021.05); *H02M 7/49* (2013.01); *H02M 1/0003* (2021.05)

(58) Field of Classification Search
CPC ............. H02M 1/0003; H02M 1/0009; H02M 1/0012; H02M 1/0016; H02M 1/0025; H02M 1/0043; H02M 1/007; H02M 1/0074; H02M 1/0077; H02M 1/008; H02M 1/08; H02M 1/088; H02M 5/40; H02M 5/44; H02M 5/45; H02M 5/458; H02M 7/155;
(Continued)

(56) References Cited

U.S. PATENT DOCUMENTS 8,581,518 B2    11/2013    Kuang et al.
2011/0127925 A1    6/2011    Huang et al.
(Continued)

FOREIGN PATENT DOCUMENTS

CN    102664682 A    *    9/2012

OTHER PUBLICATIONS

Zhou Jinghua; Zhan Xiong; Su Yanming; "The development of multi-module-cascade high-power inverter"; Apr. 5, 2004; IEEE; IECON'03. 29th Annual Conference of the IEEE Industrial Electronics Society; pp. 2645-2649 (Year: 2004).*

*Primary Examiner* — Thienvu V Tran
*Assistant Examiner* — Shahzeb K Ahmad

(57) ABSTRACT

A cascade circuit can include: N power conversion units connected in series between two ports of a power supply, where N is a positive integer greater than or equal to 2; a controller connected to one of the N power conversion units, and being configured to send a signal to be transmitted through the connected power conversion unit; where each of the power conversion units is configured to send the signal to be transmitted to a next-stage power conversion unit when the each of the power conversion unit shares a reference voltage with the adjacent next-stage power conversion unit; and where the signal to be transmitted is controlled to be transmitted from a previous-stage power conversion unit to a next-stage power conversion unit in sequence until the signal to be transmitted is received by all of the N power conversion units.

20 Claims, 12 Drawing Sheets

(58) Field of Classification Search
CPC ........ H02M 7/21; H02M 7/217; H02M 7/219;
H02M 7/23; H02M 7/42; H02M 7/48;
H02M 7/4807; H02M 7/4826; H02M
7/483; H02M 7/4833; H02M 7/4835;
H02M 7/49; H02M 7/515; H02M 7/538
See application file for complete search history.

(56) References Cited

U.S. PATENT DOCUMENTS

| | | | |
|---|---|---|---|
| 2015/0015072 A1* | 1/2015 | Deboy | H02M 7/537 |
| | | | 307/52 |
| 2017/0318639 A1 | 11/2017 | Wang et al. | |
| 2018/0295685 A1 | 10/2018 | Wang et al. | |
| 2018/0295690 A1 | 10/2018 | Chen et al. | |
| 2018/0310376 A1 | 10/2018 | Huang et al. | |
| 2019/0326831 A1* | 10/2019 | Ying | H02M 7/49 |
| 2021/0359606 A1 | 12/2021 | Han et al. | |
| 2022/0029540 A1 | 1/2022 | Zhang et al. | |
| 2022/0052622 A1* | 2/2022 | Liu | H02M 1/0074 |
| 2022/0311328 A1* | 9/2022 | Tahata | H02M 1/32 |
| 2022/0321014 A1* | 10/2022 | Hu | H02M 1/007 |
| 2023/0163675 A1* | 5/2023 | Zhang | H02J 3/381 |
| | | | 307/82 |

* cited by examiner

CASCADE CIRCUIT, CONTROL METHOD AND INTEGRATED CIRCUIT THEREOF

RELATED APPLICATIONS

This application claims the benefit of Chinese Patent Application No. 202111250658.4, filed on Oct. 26, 2021, which is incorporated herein by reference in its entirety.

FIELD OF THE INVENTION

The present invention generally relates to the field of power electronics, and more particularly to cascade circuits and methods, and associated integrated circuits.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

As compared with traditional power converters, cascaded power converters can withstand higher voltages by connecting multiple power conversion modules in series, and each of the power conversion modules withstands a lower voltage. Currently, cascaded power converters usually adopt a common duty cycle control; that is, all the power conversion modules connected in series share a same modulation signal. In order to increase the equivalent switching frequency, the carrier signal(s) usually adopt a carrier phase shift control method.

Since the multiple power conversion modules share the one modulation signal, and the carrier signal(s) need to be synchronized, a lumped control unit may be required to generate drive signals to control each of the power conversion modules. However, since the output direct-current (DC) bus of each of the power conversion modules does not share the same ground, the drive signals of the control unit may need to be transmitted to each of the power conversion modules to reach the drive circuit correspondingly through an isolation module. Therefore, isolation modules corresponding to the number of power conversion modules are typically required, and too many isolation modules cause difficulties in chip integration.

Figure 1:
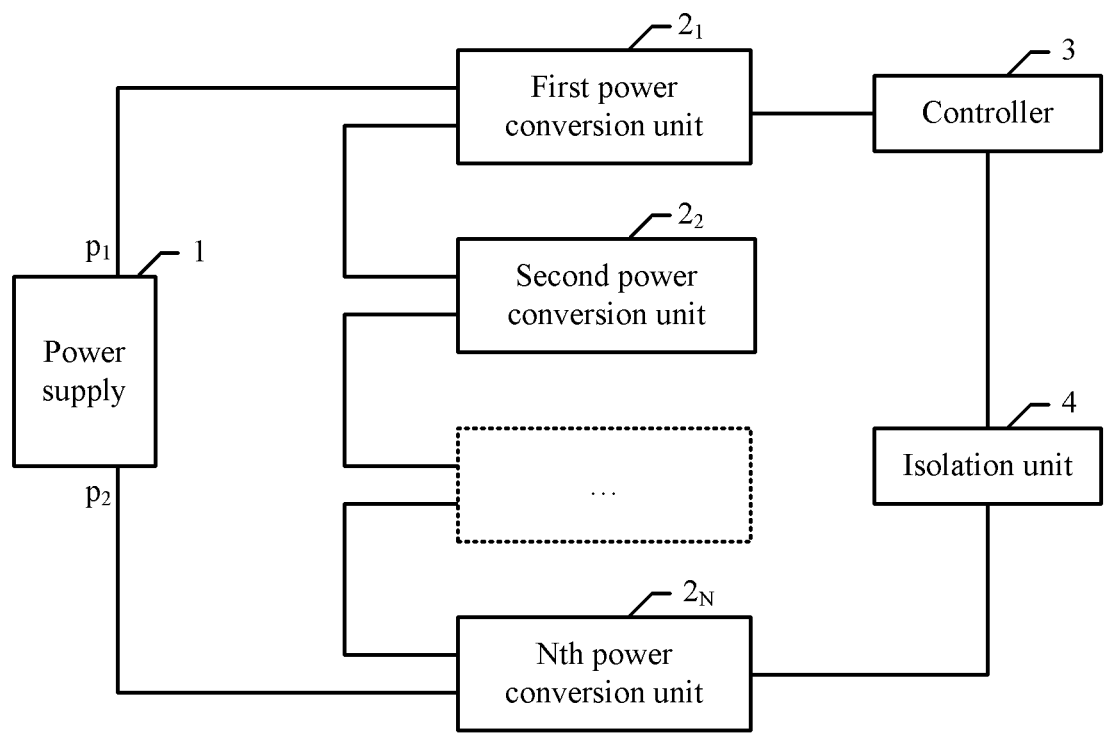
FIG. 1 is a schematic block diagram of a first example cascade circuit, in accordance with embodiments of the present invention.

Referring now to FIG. 1, shown is a schematic block diagram of a first example cascade circuit, in accordance with embodiments of the present invention. In this particular example, the cascade circuit can include power supply 1, multiple power conversion units, controller 3, and isolation unit 4. Here, a number of the power conversion units to be N is taken as an example, which are respectively $2_1, 2_2 \ldots 2_N$, where N is a positive integer greater than or equal to 2. The multiple power conversion units can connect in series between two ports of power supply 1, and may output an output signal of power supply 1 after conversion. For example, power supply 1 can include ports $p_1$ and $p_2$, and the multiple power conversion units can connect in series between ports $p_1$ and $p_2$ of power supply 1.

In particular embodiments, controller 3 can connect one of the multiple cascaded power conversion units, and may send a signal to be transmitted to the connected power conversion unit. For example, the power conversion unit connected to controller 3 is power conversion unit $2_1$; that is, controller 3 sends the signal to be transmitted to power conversion unit $2_1$. In particular embodiments, isolation unit 4 can connect between the Nth power conversion unit $2_N$ and controller 3, and may transmit an output signal of the Nth power conversion unit $2_N$ to controller 3 in order to ensure that the transmitted signal is correct. As a result, the first to the Nth power conversion units $2_1$-$2_N$ may operate in predetermined phases cyclically.

Furthermore, power conversion unit $2_1$ can transmit a signal to power conversion unit $2_2$ after receiving the signal to be transmitted sent by controller 3. Power conversion unit $2_2$ may transmit the signal to a next-stage power conversion unit, and so forth, until the signal is transmitted to the Nth power conversion unit $2_N$. The Nth power conversion unit $2_N$ then can transmit the signal to controller 3 through isolation unit 4. Furthermore, power conversion unit $2_1$ to an (N−1)th power conversion unit $2_{N-1}$ can send the signal to be transmitted to the next-stage power conversion unit when sharing ground with the adjacent next-stage power conversion unit. That is, for an ith power conversion unit $2_i$, it can send the signal to be transmitted to an (i+1)th power conversion unit $2i_{+1}$ when sharing the ground with the (i+1)th power conversion unit $2_{i+1}$, where i=1, 2, . . . N−1.

In particular embodiments, the signal to be transmitted is a modulation signal, such that each of the power conversion units generates drive signals based on the modulation signal to perform power conversion. Certain embodiments do not limit the method of generating the modulation signal, and the controller may generate the modulation signal using any suitable methods. In addition, a system may utilize the same modulation signal to control all the power conversion units, or may use different modulation signals for the power conversion units. In this case, the modulation signals herein are data packets including modulation signals, respectively corresponding to all the power conversion units. Each of the power conversion units may obtain the corresponding modulation signal from the data packets according to its own number.

Each of the power conversion units can generate the drive signals based on the modulation signal and carrier signals, and may also perform power conversion according to the drive signals. Accordingly, each of the power conversion units may need to obtain the carrier signals. Before each of the power conversion units performs power conversion, each of the power conversion units may receive a carrier generation signal, the carrier generation signal can include a carrier phase, a carrier period, and a synchronization signal, and each of the power conversion units can generate the corresponding carrier signals based on the carrier phase, the carrier period, and the synchronization signal. When each of the power conversion units performs power conversion, the power conversion may be performed based on its corresponding carrier signals and the modulation signal.

In addition, controller 3 can send the carrier phase, the carrier period, and the synchronization signal to power conversion unit $2_1$. Further, power conversion unit $2_1$ may send the carrier phase, the carrier period, and the synchronization signal to power conversion unit $2_2$, and so forth, until all the power conversion units have obtained the carrier phase, the carrier period, and the synchronization signal. In some cases, the controller may need to use N isolation units respectively connected to the power conversion units, which is disadvantageous for the integration of the cascade circuit. In particular embodiments, each of the power conversion units can be controlled to send the signal to be transmitted to the next-stage power conversion unit when each of the power conversion units shares the ground with the adjacent next-stage power conversion unit. Therefore, only one isolation unit may be required to decrease a number of the isolation modules, which can facilitate integration of the cascade circuit.

Figure 2:
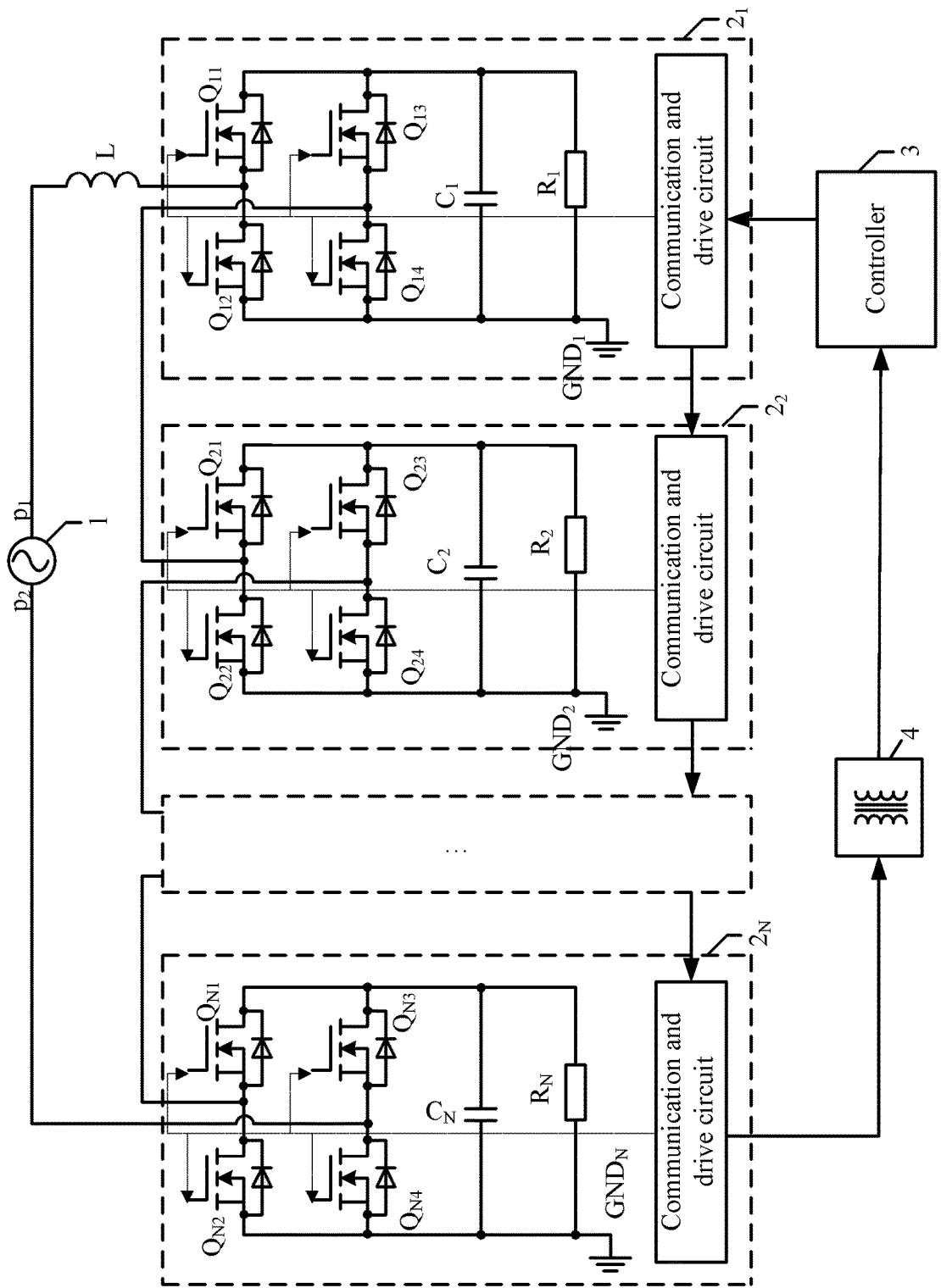
FIG. 2 is a schematic block diagram of the example cascade circuit, in accordance with embodiments of the present invention.

Referring now to FIG. 2, shown is a schematic block diagram of the example cascade circuit, in accordance with embodiments of the present invention. The power conversion unit may include any suitable power converter circuitry (e.g., a rectifier, a DC-DC converter, etc.). If the power conversion unit is a rectifier as an example, FIG. 2 represents a more detailed schematic block diagram corresponding to FIG. 1. In the example of FIG. 2, power supply 1 is an alternating current (AC) power supply configured to output an AC signal. The power conversion unit can rectify the AC signal. Further, the cascade circuit can include inductor L, which can connect between port $p_1$ of power supply 1 and conversion unit $2_1$ and may filter an electrical signal output by power supply 1.

The power conversion unit can include a rectifier circuit, and the rectifier circuit is a full-bridge circuit, which can include first and second arms. The first and second arms can connect in parallel to an output terminal of the rectifier circuit. The first arm can include first and second switches connected in series between a bus of the power conversion unit and a reference ground of the power conversion unit. The second arm can include third and fourth switches. Take an mth power conversion unit $2_m$ as an example for illustration. The first switch is $Q_{m1}$, the second switch is $Q_{m2}$, the third switch is $Q_{m3}$, and the fourth switch is $Q_{m4}$, m=1, 2 . . . N. For example, the bus of each of the power conversion units may refer to a wire connected to a drain of the first switch and a drain of the third switch of the power conversion unit. The reference ground may refer to a wire connected between a ground terminal $GND_m$ and a source of the second switch.

A midpoint of the first arm of power conversion unit $2_1$ can connect to port $p_1$ of power supply 1, a midpoint of the first arm of each of the other power conversion units can connect to a midpoint of the second arm of a previous-stage power conversion unit, and a midpoint of the second arm of the last power conversion unit $2_N$ can connect to the second port $p_2$ of power supply 1. Here, the midpoint of the first arm is a connection point of the first and second switches, and the midpoint of the second arm is a connection point of the third and fourth switches.

The rectifier circuit can rectify the output signal (or after being filtered by the inductor L) of power supply 1, and outputs that signal. The power conversion unit can also include an output capacitor connected to the output terminal of the rectifier circuit, and may filter a DC signal output by the rectifier circuit. The output capacitors are $C_1, C_2 \ldots C_N$ as shown in FIG. 2. The power conversion unit can also include a load, which can connect to the output terminal of the rectifier circuit and can connect in parallel with the output capacitor. In FIG. 2, the load may be replaced by a resistor, such as $R_1, R_2 \ldots R_N$. Further, the power conversion unit can also include a communication and drive circuit, which may communicate with the other power conversion units and control the rectifier circuit.

Figure 3:
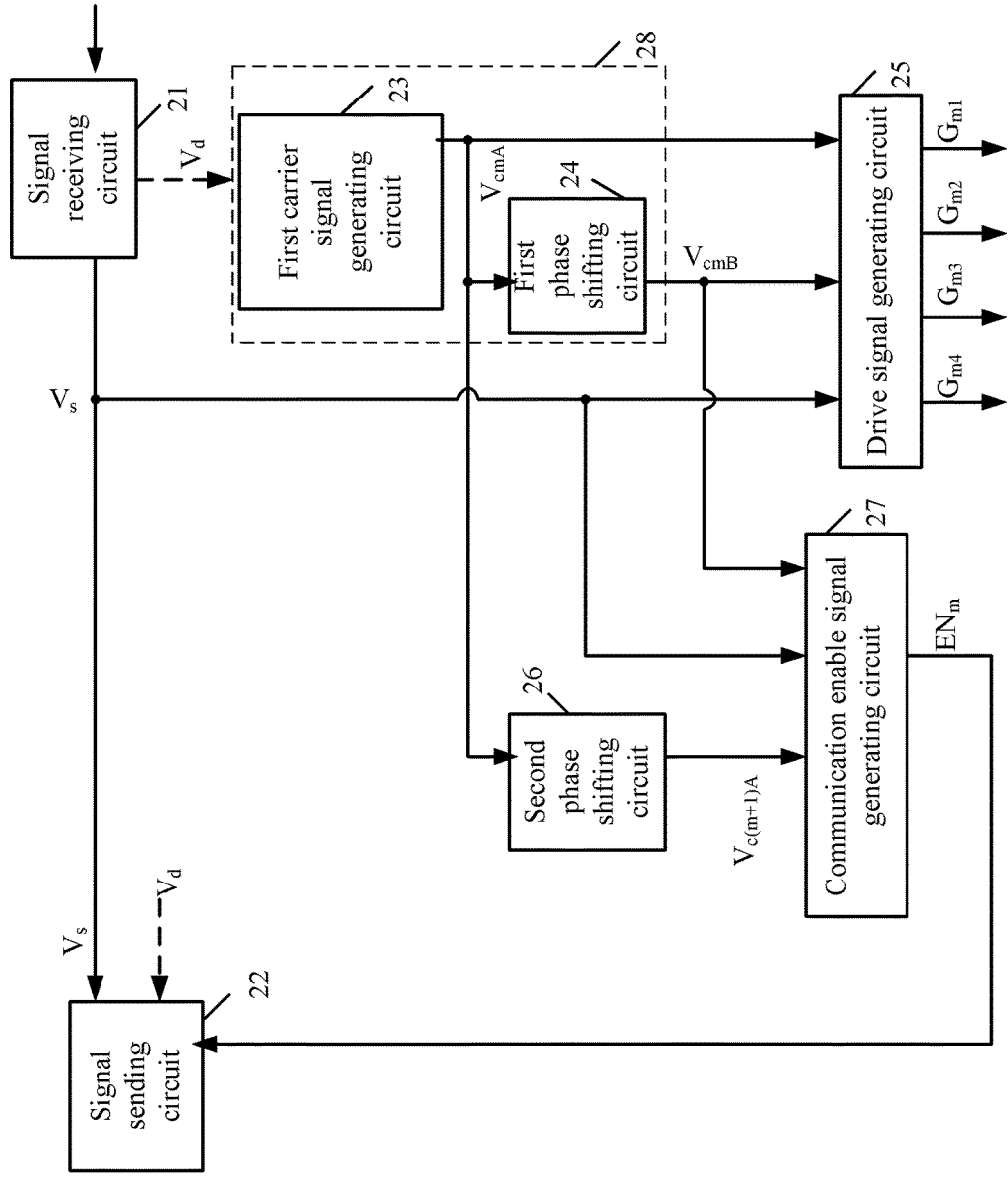
FIG. 3 is a schematic block diagram of an example communication and drive circuit, in accordance with embodiments of the present invention.

Referring now to FIG. 3, shown is a schematic block diagram of an example communication and drive circuit, in accordance with embodiments of the present invention. In this particular example, the communication and drive circuit can include signal receiving circuit 21, signal sending circuit 22, drive signal generating circuit 25, phase shifting circuit 26, communication enable signal generating circuit 27, and carrier signal generating circuit 28. Carrier signal generating circuit 28 can include carrier signal generating circuit 23 and phase shifting circuit 24. In particular embodiments, signal receiving circuit 21 can receive the carrier generation signal before the rectifier circuit is started, and may receive the signal to be transmitted after the rectifier circuit has started.

In this example, a signal received by signal receiving circuit 21 in power conversion unit $2_1$ is the signal sent by controller 3. A signal received by signal receiving circuit 21 in each of the second to the Nth power conversion units is the signal sent by the connected previous-stage power conversion unit. That is, for the mth power conversion unit, the signal received by signal receiving circuit 21 in the power conversion unit is the signal sent by controller 3 when m=1, and the signal received by signal receiving circuit 21 in the power conversion unit is the signal sent by the (m−1)th power conversion unit when m=2, 3 . . . N. Prior to the rectifier circuit being started, the signal transmitted between the controller and each of the power conversion units may be the carrier generation signal, which can include information, such as the carrier phase, the carrier period, and the synchronization signal, etc., used for generating the corresponding carrier signals (e.g., signal $V_d$). After the rectifier circuit has started, the signal transmitted between the controller and each of the power conversion units may be the modulation signal (e.g., signal $V_s$).

In particular embodiments, carrier signal generating circuit 28 can generate the carrier signals based on signal $V_d$. Signal $V_d$ can include the carrier phase, the carrier period, and the synchronization signal. Furthermore, carrier signal generating circuit 28 can generate carrier signals $V_{cmA}$ and $V_{cmB}$ based on the carrier phase, the carrier period, and the synchronization signal. For example, carrier signal $V_{cmA}$ is a carrier signal of the first arm, and carrier signal $V_{cmB}$ is a carrier signal of the second arm. In particular embodiments, carrier signal generating circuit 28 can include carrier signal generating circuit 23 and phase shifting circuit 24. Carrier signal generating circuit 23 can generate carrier signal $V_{cmA}$ based on the carrier generation signal $V_d$. Phase shifting circuit 24 can phase-shift carrier signal $V_{cmA}$ in order to generate carrier signal $V_{cmB}$. For example, a phase difference between carrier signals $V_{cmA}$ and $V_{cmB}$ is 180°.

Prior to the circuit being started, controller 3 may transmit the information for generating the corresponding carrier signals by each of the power conversion units, including the carrier phase, the carrier period, and the synchronization signal, through a communication circuit between adjacent power conversion units. This can be the same circuit as signal sending circuit 22 and signal receiving circuit 21 that transmit modulation signal $V_s$ when the circuit is started, or may be a different circuit. For example, the communication circuit can be the same circuit as signal sending circuit 22 and signal receiving circuit 21 that transmit modulation signal $V_s$ when the circuit is started. Each of the power conversion units can generate the correct carrier phase shifting effect based on the synchronization signal and the corresponding carrier phase. After that, carrier signal generation circuit 28 in each of the power conversion units may utilize a timer to generate a triangular carrier signal based on the carrier period, and can generate carrier signal $V_{cmA}$ with a phase difference from the synchronization signal correspondingly through phase shifting according to the carrier phase, and also phase-shifts carrier signal $V_{cmA}$ by 180° to generate carrier signal $V_{cmB}$.

It should be understood that the generation of the carrier signals may need to be completed before the rectifier circuit is activated. For example, before the rectifier circuit operates, lower transistors of all the power conversion units can be turned on, such as the second and fourth switches. In this way, all the power conversion units may share a common ground, such that the signal can be transmitted directly. After the signal has been transmitted, the normal circuit may then be allowed to operate. Of course, signal transmission before the circuit has started may further adopt other suitable methods.

In particular embodiments, drive signal generating circuit 25 can generate the drive signals based on modulation signal $V_s$, carrier signal $V_{cmA}$, and carrier signal $V_{cmB}$, after the rectifier circuit has started to control the state of the switches in the full-bridge circuit. For example, the drive signals can include $G_{m1}$, $G_{m2}$, $G_{m2}$, and $G_{m4}$, which can respectively control switches $Q_{m1}$, $Q_{m2}$, $Q_{m3}$, and $Q_{m4}$. Further, drive signal generating circuit 25 can generate drive signals $G_{m1}$ and $G_{m2}$ based on modulation signal $V_s$ and carrier signal $V_{cmA}$, and may generate drive signals $G_{m3}$ and $G_{m4}$ based on modulation signal $V_s$ and carrier signal $V_{cmB}$.

Figure 4:
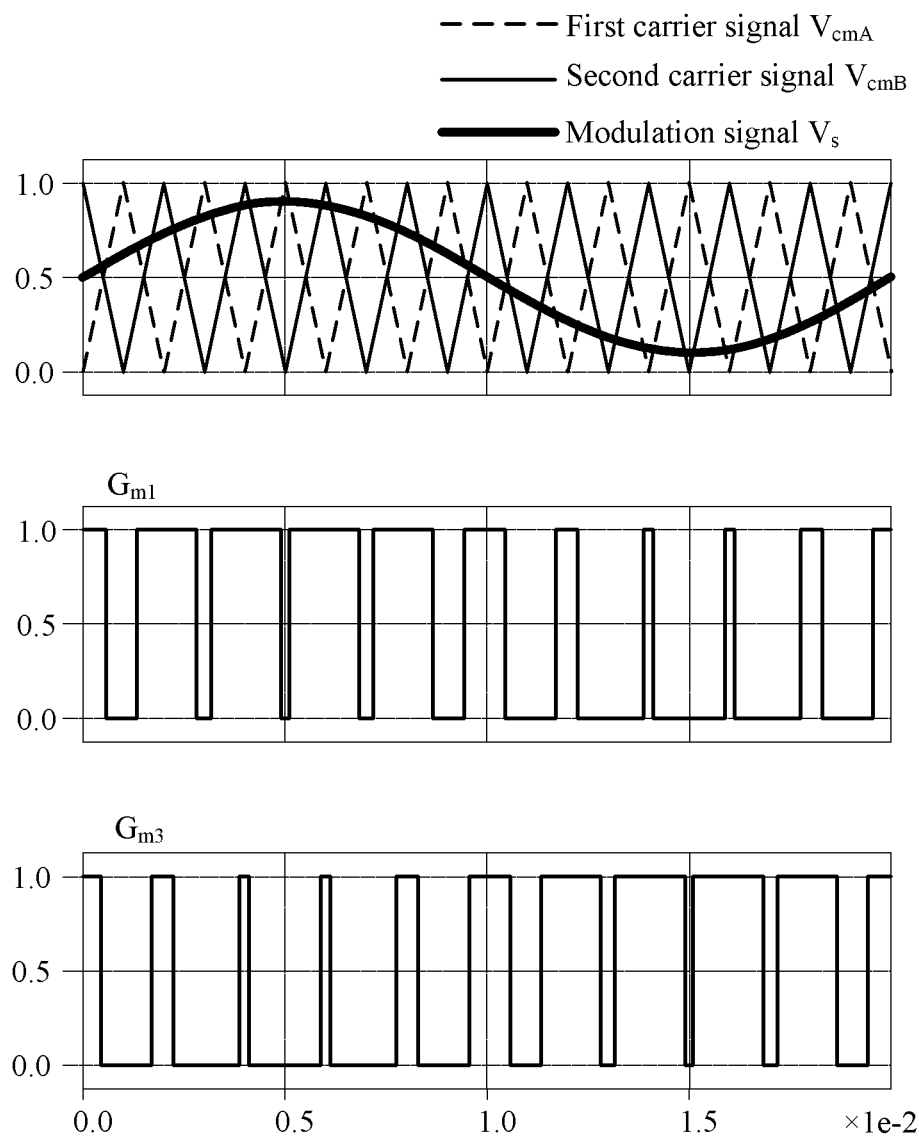
FIG. 4 is a waveform diagram of example drive signals, in accordance with embodiments of the present invention.

Referring now to FIG. 4, shown is a waveform diagram of example drive signals, in accordance with embodiments of the present invention. In particular waveform diagrams of carrier signal $V_{cmA}$, carrier signal $V_{cmB}$, and modulation signal $V_s$ are shown, as well as a signal waveform diagram of drive signals $G_{m1}$ and $G_{m3}$. A waveform of $G_{m2}$ can be complementary to that of $G_{m1}$, and a waveform of $G_{m4}$ may be complementary to that of $G_{m3}$. For example, for the first arm, when modulation signal $V_s$ is greater than carrier signal $V_{cmA}$, drive signal $G_{m1}$ can be at a high level and drive signal $G_{m2}$ at a low level, such that switch $Q_{m1}$ is turned on and switch $Q_{m2}$ is turned off. When modulation signal $V_s$ is smaller/less than carrier signal $V_{cmA}$, drive signal $G_{m1}$ can be at a low level and drive signal $G_{m2}$ at a high level, such that switch $Q_{m1}$ is turned off and switch $Q_{m2}$ is turned on. For the second arm, when modulation signal $V_s$ is greater than carrier signal $V_{cmB}$, drive signal $G_{m3}$ can be at a low level and drive signal $G_{m4}$ at a high level, so that switch $Q_{m3}$ is turned off and switch $Q_{m4}$ is turned on. When modulation signal $V_s$ is smaller/less than carrier signal $V_{cmB}$, drive signal $G_{m3}$ can be at a high level and drive signal $G_{m4}$ is at a low level, such that switch $Q_{m3}$ is turned on and switch $Q_{m4}$ is turned off.

For example, drive signals $G_{m1}$, $G_{m2}$, $G_{m3}$, and $G_{m4}$ can be pulse-width modulation (PWM) signals. In particular embodiments, switches $Q_{m1}$, $Q_{m2}$, $Q_{m3}$, and $Q_{m4}$ can be controlled switches, which may be implemented by using metal-oxide-semiconductor field-effect transistors (MOSFETs). It should be understood that a bipolar junction transistor (BJT) or an insulated gate bipolar transistor (IGBT) may also be utilized in certain embodiments. Furthermore, communication enable signal generating circuit 27 can output an active communication enable signal when the current power conversion unit shares the ground with the adjacent next-stage power conversion unit, in order to control signal sending circuit 22 of the current power conversion unit to send the signal to be transmitted to the next-stage power conversion unit.

Take the current power conversion unit being the mth power conversion unit as an example for illustration. $V_{cmA}$ denotes the first carrier signal of the mth power conversion unit, and $V_{c(m+1)A}$ denotes the first carrier signal of an (m+1)th power conversion unit. Communication enable signal generating circuit 27 can generate communication enable signal $EN_m$ based on carrier signal $V_{cmB}$ of the current power conversion unit and carrier signal $V_{c(m+1)A}$ of the next-stage power conversion unit and the modulation signal $V_s$, such that the mth power conversion unit is enabled to send the signal to be transmitted to the (m+1)th power conversion unit. In particular embodiments, carrier signal $V_{c(m+1)A}$ of the next-stage power conversion unit received by communication enable signal generating circuit 27 can be generated through phase shifting by phase shifting circuit 26 based on carrier signal $V_{cmA}$ of the current power conversion unit. For example, carrier signal $V_{c(m+1)A}$ of the next-stage power conversion unit received by communication enable signal generating circuit 27 may be directly obtained from the first carrier signal output by carrier signal generating circuit 23 of the next-stage power conversion unit.

In particular embodiments, phase shifting circuit 26 can phase-shift the signal $V_{cmA}$ by $$\frac{\pi}{N}$$

to obtain the signal $V_{c(m+1)A}$, where N is a total number of power conversion units. Phase shifting circuit 24 may phase-shift carrier signal $V_{cmA}$ to generate carrier signal $V_{cmB}$. Thus, communication enable signal generating circuit 27 can generate communication enable signal $EN_m$ based on carrier signal $V_{cmB}$ of the current power conversion unit, carrier signal $V_{c(m+1)A}$ of the next-stage power conversion unit, and modulation signal $V_s$. $EN_m$ may denote the communication enable signal generated by the mth power conversion unit.

Figure 5:
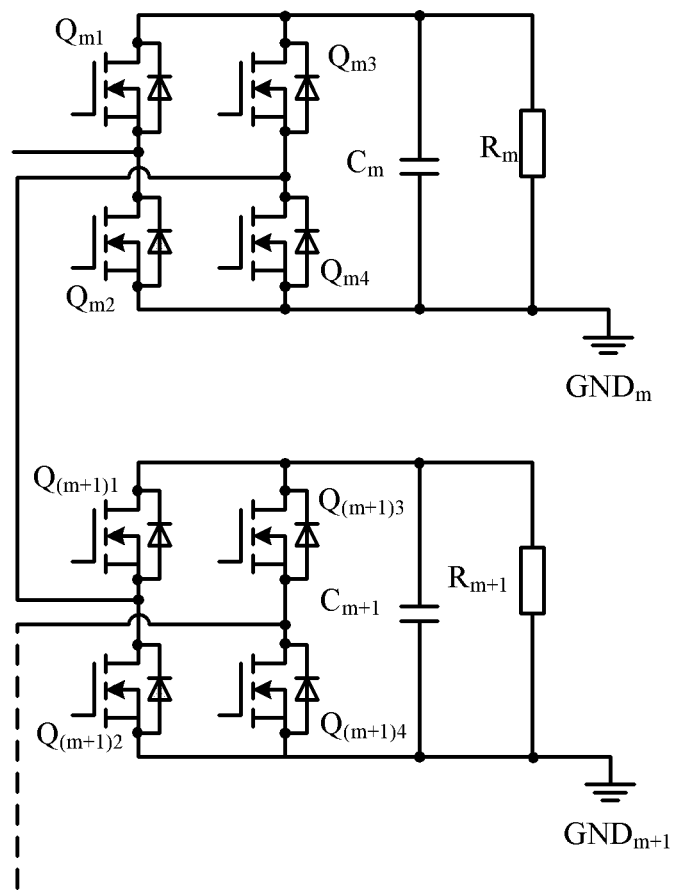
FIG. 5 is a schematic block diagram of an example connection of rectifier circuits of two adjacent power conversion units, in accordance with embodiments of the present invention.

Referring now to FIG. 5, shown is a schematic block diagram of an example connection of rectifier circuits of two adjacent power conversion units, in accordance with embodiments of the present invention. In this particular example, a connection of rectifier circuits of the mth power conversion unit and the (m+1)th power conversion unit is shown. When switches $Q_{m4}$ and $Q_{(m+1)2}$ are turned on at the same time, the reference ground $GND_m$ of the mth power conversion unit can be directly connected to a reference ground $GND_{m+1}$ of the (m+1)th power conversion unit; that is, the two power conversion units are in a common ground state.

Figure 6:
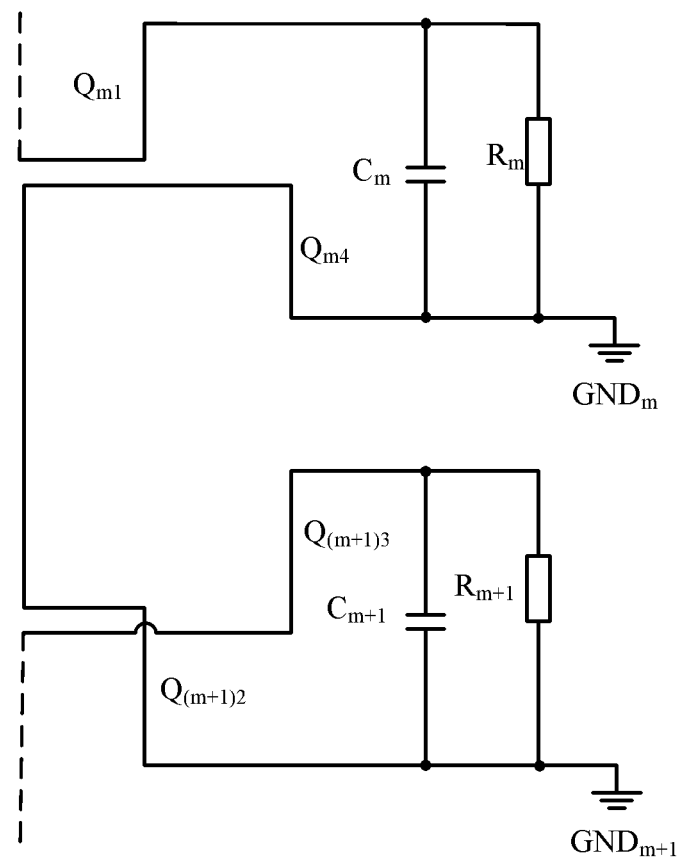
FIG. 6 is an equivalent schematic block diagram of an example when two adjacent power conversion units share ground, in accordance with embodiments of the present invention.

Referring now to FIG. 6, shown is an equivalent schematic block diagram of an example when two adjacent power conversion units share ground, in accordance with embodiments of the present invention. Here, for the mth power conversion unit, switches $Q_{m1}$ and $Q_{m4}$ can be turned on. For the (m+1)th power conversion unit, switches $Q_{(m+1)2}$ and $Q_{(m+1)3}$ may be turned on. It should be understood that only switches $Q_{m4}$ and $Q_{(m+1)2}$ being turned on at the same time may be necessary, and the state of the switches of the other arm of each of the two power conversion units can be arbitrary. For example, for the mth power conversion unit, switches $Q_{m2}$ and $Q_{m4}$ may be turned on. Similarly, for the (m+1)th power conversion unit, switches $Q_{(m+1)2}$ and $Q_{(m+1)4}$ may be turned on. Alternatively, when switches $Q_{m3}$ and $Q_{(m+1)1}$ are turned on at the same time, a voltage difference between ground terminals of two power conversion units is a difference between bus voltages of the two power conversion units. When voltages output by the rectifier circuits of two power conversion units are equal, the two power conversion units may share the ground.

Figure 7:
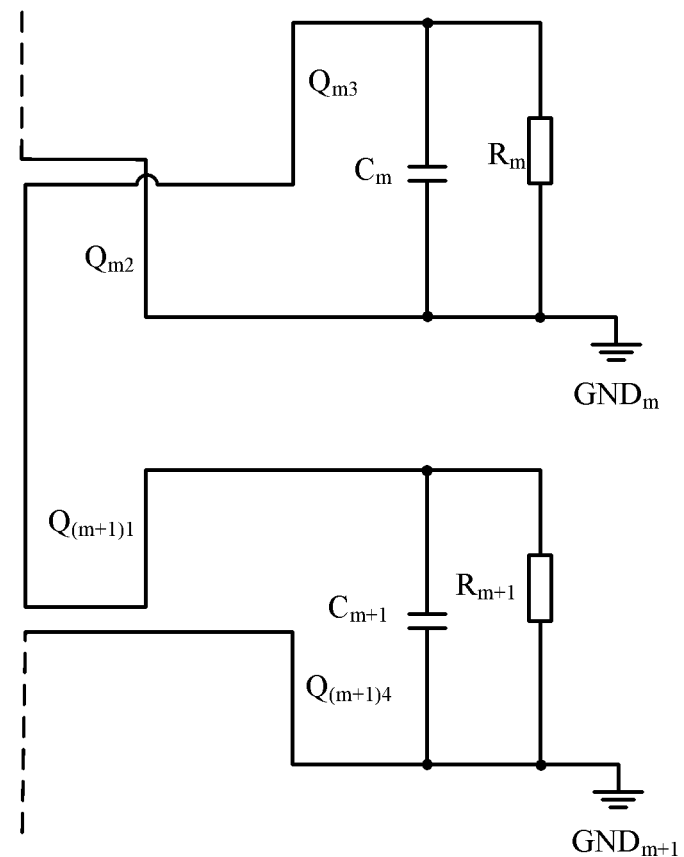
FIG. 7 is an equivalent schematic block diagram of another example when two adjacent power conversion units share ground, in accordance with embodiments of the present invention.

Referring now to FIG. 7, is an equivalent schematic block diagram of another example when two adjacent power conversion units share ground, in accordance with embodiments of the present invention. FIG. 7 shows one of the equivalent circuits. That is, for the mth power conversion unit, switches $Q_{m2}$ and $Q_{m3}$ can be turned on. For the (m+1)th power conversion unit, switches $Q_{(m+1)1}$ and $Q_{(m+1)4}$ may be turned on. It should be understood that only switches $Q_{m3}$ and $Q_{(m+1)1}$ being turned on at the same time may be necessary, and the state of the switches of the other arm of each of the two power conversion units can be arbitrary. The bus voltages can be output voltages of the rectifier circuits. Only the signal being transmitted when switches $Q_{m4}$ and $Q_{(m+1)2}$ are turned on at the same time is taken as an example here for illustration. For the second arm, when modulation signal $V_s$ is greater than carrier signal $V_{cmB}$, switch $Q_{m3}$ can be turned off and switch $Q_{m4}$ turned on. For the first arm, when modulation signal $V_s$ is smaller/less than carrier signal $V_{cmA}$, switch $Q_{m1}$ can be turned off and switch $Q_{m2}$ turned on.

Figure 8:
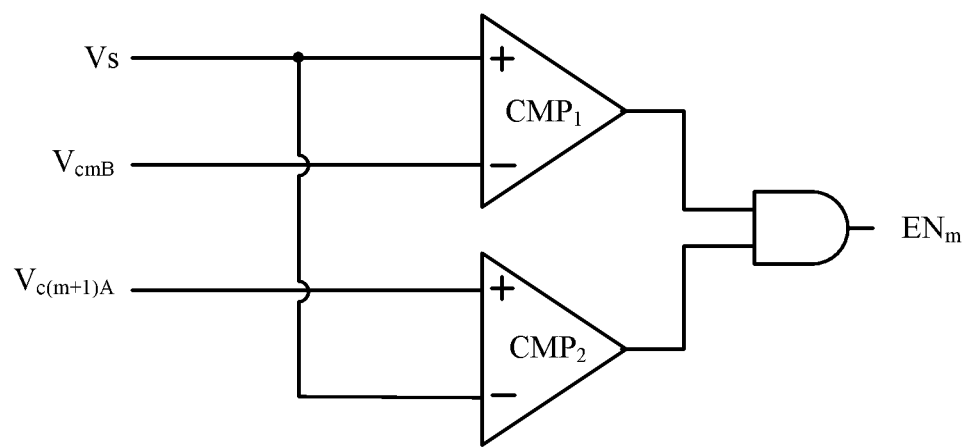
FIG. 8 is a schematic block diagram of an example communication enable signal generating circuit, in accordance with embodiments of the present invention.

Referring now to FIG. 8, shown is a schematic block diagram of an example communication enable signal generating circuit, in accordance with embodiments of the present invention. In this particular example, communication enable signal generating circuit 27 can include comparator $CMP_1$, comparator $CMP_2$, and a logic circuit. For example, modulation signal $V_s$ is input to a non-inverting input terminal of comparator $CMP_1$, and carrier signal $V_{cmB}$ of the mth power conversion unit is input to an inverting input terminal of comparator $CMP_1$. Modulation signal $V_s$ can be input to an inverting input terminal of comparator $CMP_2$, and carrier signal $V_{c(m+1)A}$ of the (m+1)th power conversion unit can be input to a non-inverting input terminal of comparator $CMP_2$. For example, the logic circuit is an AND-gate. Hence, when modulation signal $V_s$ is greater than carrier signal $V_{cmB}$ of the mth power conversion unit, an output of comparator $CMP_1$ can be at a high level. When modulation signal $V_s$ is smaller/less than carrier signal $V_{c(m+1)A}$ of the (m+1)th power conversion unit, an output of comparator $CMP_2$ can be at a high level. When the two comparators both output the high level, $EN_m$ output by the AND-gate can be at the high level; that is, communication enable signal $EN_m$ is active at this time. Thus, for the mth power conversion unit, switch $Q_{m3}$ can be turned off and switch $Q_{m4}$ turned on. At the same time, for the (m+1)th power conversion unit, switch $Q_{(m+1)2}$ can be turned on and switch $Q_{(m+1)1}$ turned off, such that the mth power conversion unit and the (m+1)th power conversion unit share the ground.

It should be understood that the communication enable signal generating circuit shown in FIG. 8 is only one particular example, which allows switches $Q_{m4}$ and $Q_{(m+1)2}$ to be turned on at the same time. Certain embodiments do not limit the circuit structure as long as active communication enable signal $EN_m$ can be output when modulation signal $V_s$ is greater than signal $V_{cmB}$ and modulation signal $V_m$ is smaller than signal $V_{c(m+1)A}$. It should be noted that, in another situation where the two power conversion units share the same ground, modulation signal $V_s$ can be smaller than carrier signal $V_{cmB}$ of the second arm of the current power conversion unit and modulation signal $V_s$ greater than carrier signal $V_{c(m+1)A}$ of the first arm of the next-stage power conversion unit, such that switches $Q_3$ and $Q_{(m+1)1}$ are turned on at the same time. When the voltages output by the rectifier circuits of the two power conversion units are equal, the two power conversion units may share the same ground, and communication can similarly be performed. That is, communication enable signal $EN_m$ can be active, which can correspond to the situation in which $V_{cmB}$ and $V_{c(m+1)A}$ in FIG. 8 are swapped in position.

Figure 9:
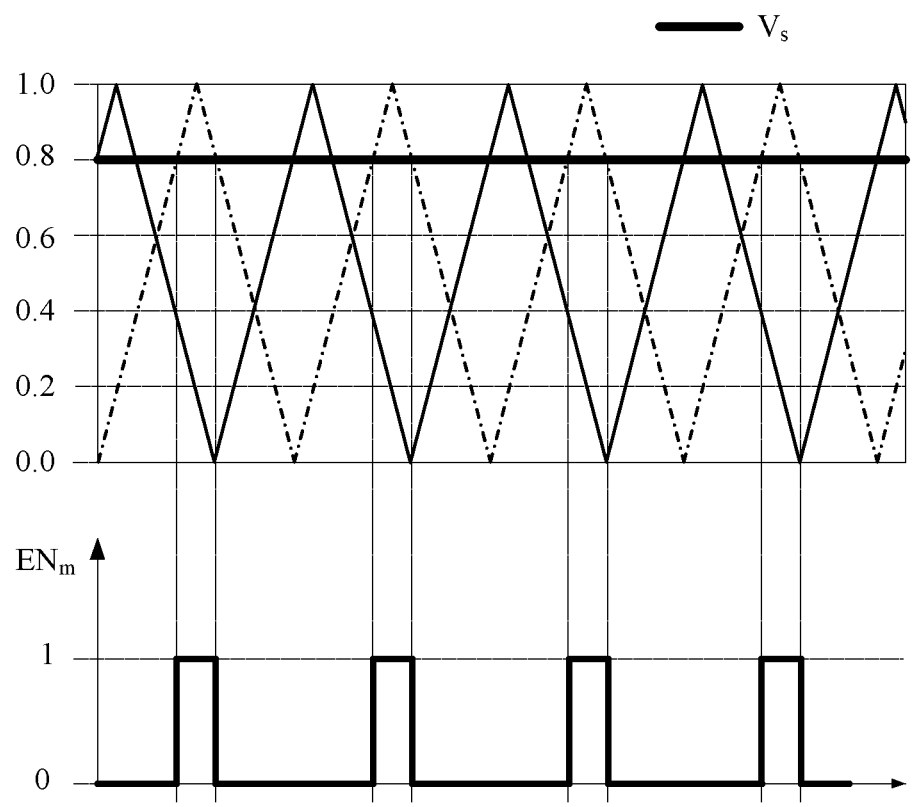
FIG. 9 is a waveform diagram of an example communication enable signal of one power conversion unit, in accordance with embodiments of the present invention.

Referring now to FIG. 9, shown is a waveform diagram of an example communication enable signal of one power conversion unit, in accordance with embodiments of the present invention. This example shows a waveform diagram of signals $V_{cmB}$, $V_{c(m+1)A}$, $V_s$, and $EN_m$. For the mth power conversion unit, communication enable signal $EN_m$ can be at a high level to control the signal sending circuit to transmit the signal when modulation signal $V_s$ is greater than carrier signal $V_{cmB}$ and smaller/less than carrier signal $V_{c(m+1)A}$. As shown, an interval in which communication enable signal $EN_m$ is at a high level can be determined by modulation signal $V_s$ being smaller than $V_{c(m+1)A}$. It should be understood that signals $V_{cmB}$, $V_{c(m+1)A}$, and $V_s$ as shown are schematic amplifications of part of the signals in FIG. 4. Hence, modulation signal $V_s$ can be approximated as a straight line.

Figure 10:
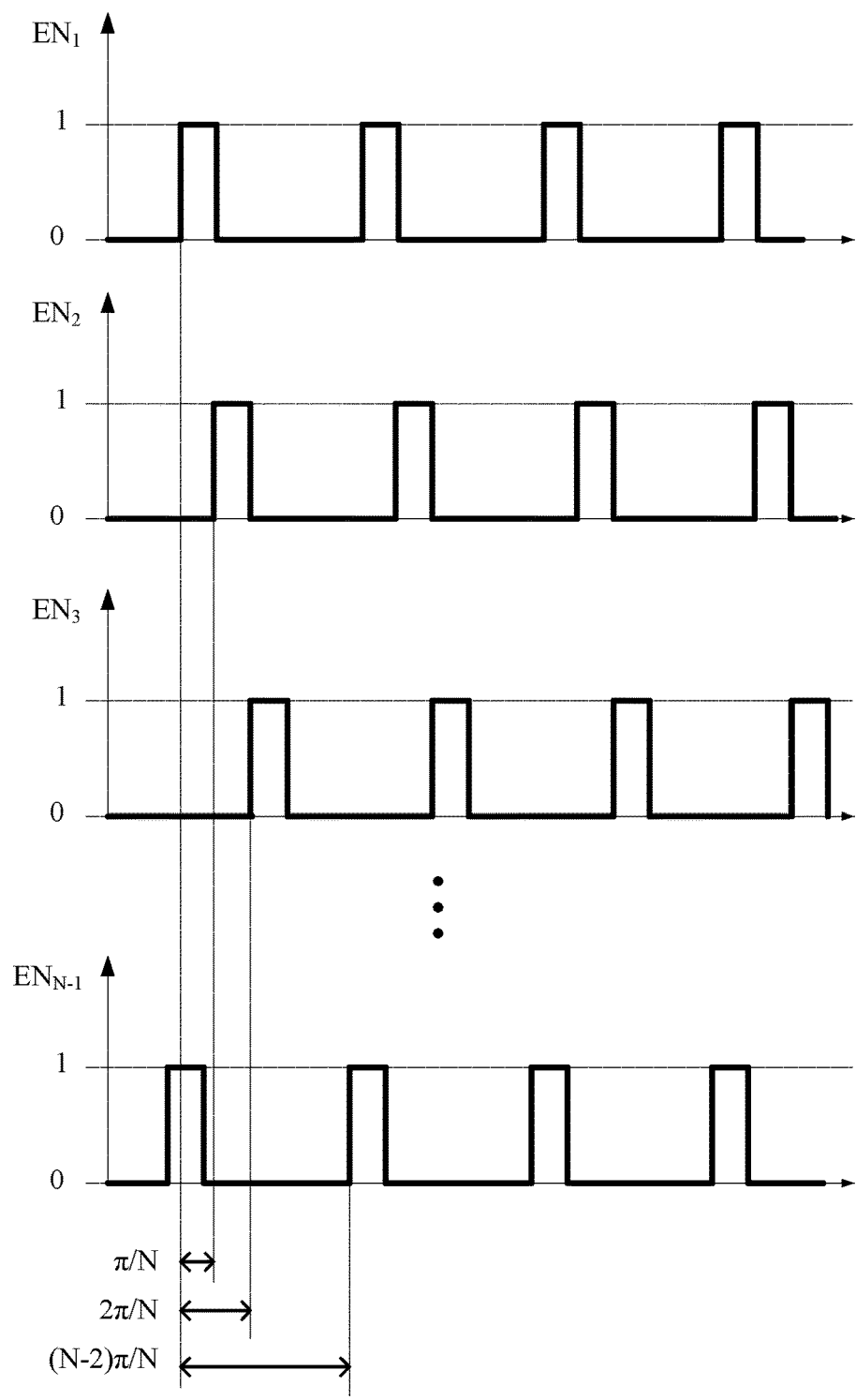
FIG. 10 is a waveform diagram of example communication enable signals of various power conversion units, in accordance with embodiments of the present invention.

Referring now to FIG. 10, shown is a waveform diagram of example communication enable signals of various power conversion units, in accordance with embodiments of the present invention. This example shows a waveform diagram of communication enable signals of the first to the (N−1)th power conversion units. In order to transmit the signal from the first power conversion unit to the Nth power conversion unit as soon as possible, phases of the carrier signals from the first power conversion unit to the Nth power conversion unit can be configured at angles that increase sequentially. That is, phase angles of the carrier signals of the first arms may be 0

$$\frac{\pi}{N}, \frac{2\pi}{N}, \ldots, \frac{(N-1)\pi}{N}$$

sequentially from the first power conversion unit to the Nth power conversion unit. Correspondingly, phase angles of the communication enable signals from the first power conversion unit to the (N−1)th power conversion unit can increase sequentially, and a phase difference between the communication enable signals of two adjacent power conversion units may be $$\frac{\pi}{N}.$$

That is, a phase difference between the mth power conversion unit and the first power conversion unit can be $$(m-1)\frac{\pi}{N}.$$

Therefore, by reasonably configuring a phase shift angle of the carrier signals of each of the power conversion units, the communication can be completed in the shortest possible time.

In particular embodiments, signal sending circuit 22 can transmit the signal to the next-stage power conversion unit. For example, before the rectifier circuit has started, signal sending circuit 22 may send the carrier generation signal (e.g., including the carrier phase, the carrier period, and the synchronization signal, etc.) to the next-stage power conversion unit. After the rectifier circuit as started, signal sending circuit 22 may send the modulation signal to the next-stage power conversion unit when the communication enable signal is active.

For example, before the rectifier circuit as started, signal sending circuit 22 may send the carrier phase, the carrier period, and the synchronization signal to the next-stage power conversion unit. This can be implemented by using any suitable methods. For example, the power conversion unit can include two communication enable signal generating circuits, one of which is the circuit shown in FIG. 8, and can start operating after the rectifier circuit is started, in order to generate the communication enable signal to control the signal sending circuit when two power conversion units share the same ground. The other communication enable signal generating circuit may operate before the rectifier circuit is started, in order to control the signal sending circuit to be in a working state all the time.

In another example, a switch can be disposed at an output terminal of the power supply, and the switch can be controlled to be turned off before starting, so that there are no voltages across the capacitors of all the power conversion units. In addition, the lower transistors (e.g., $Q_{m2}$ and $Q_{m4}$) of the first and second arms of each of the power conversion units can be turned on, such that all the power conversion units share the same ground and the signal can be directly transmitted. After the signal transmission has completed, each of the power conversion units can be controlled to operate normally, and the switch controlled to be turned on.

In the example of FIG. 1, the first to the Nth power conversion units $2_1$-$2_N$ are connected in sequence. Therefore, for the first to the N−1th power conversion units $2_1$-$2_{N-1}$, when they share the ground with the next-stage power conversion units, they can send the signal to be transmitted to the next-stage power conversion units. However, for the signal transmission between the Nth power conversion unit $2_N$ and controller 3, the signal may need to be transmitted through isolation unit 4 because there is no common ground between the two. As a result, the Nth power conversion unit $2_N$ can send the signal to be transmitted to controller 3 at any time during an operating cycle. Correspondingly, in this manner the communication enable signal generating circuit and/or the signal sending circuit or the corresponding working process of the Nth power conversion unit $2_N$ may be different from those of the other power conversion units. Particular embodiments do not limit the structures and working processes of the communication enable signal generating circuit and/or the signal sending circuit of the Nth power conversion unit $2_N$, as long as the signal to be transmitted can be sent to controller 3 after the signal to be transmitted sent by the N−1th power conversion unit $2_{N-1}$ is received.

In particular embodiments, each of the power conversion units can be controlled to send the signal to be transmitted to the next-stage power conversion unit when each power conversion unit shares the ground with the adjacent next-stage power conversion unit. As a result, only one isolation unit may be required, the number of isolation modules can be reduced, and integration of the cascade circuit facilitated.

Figure 11:
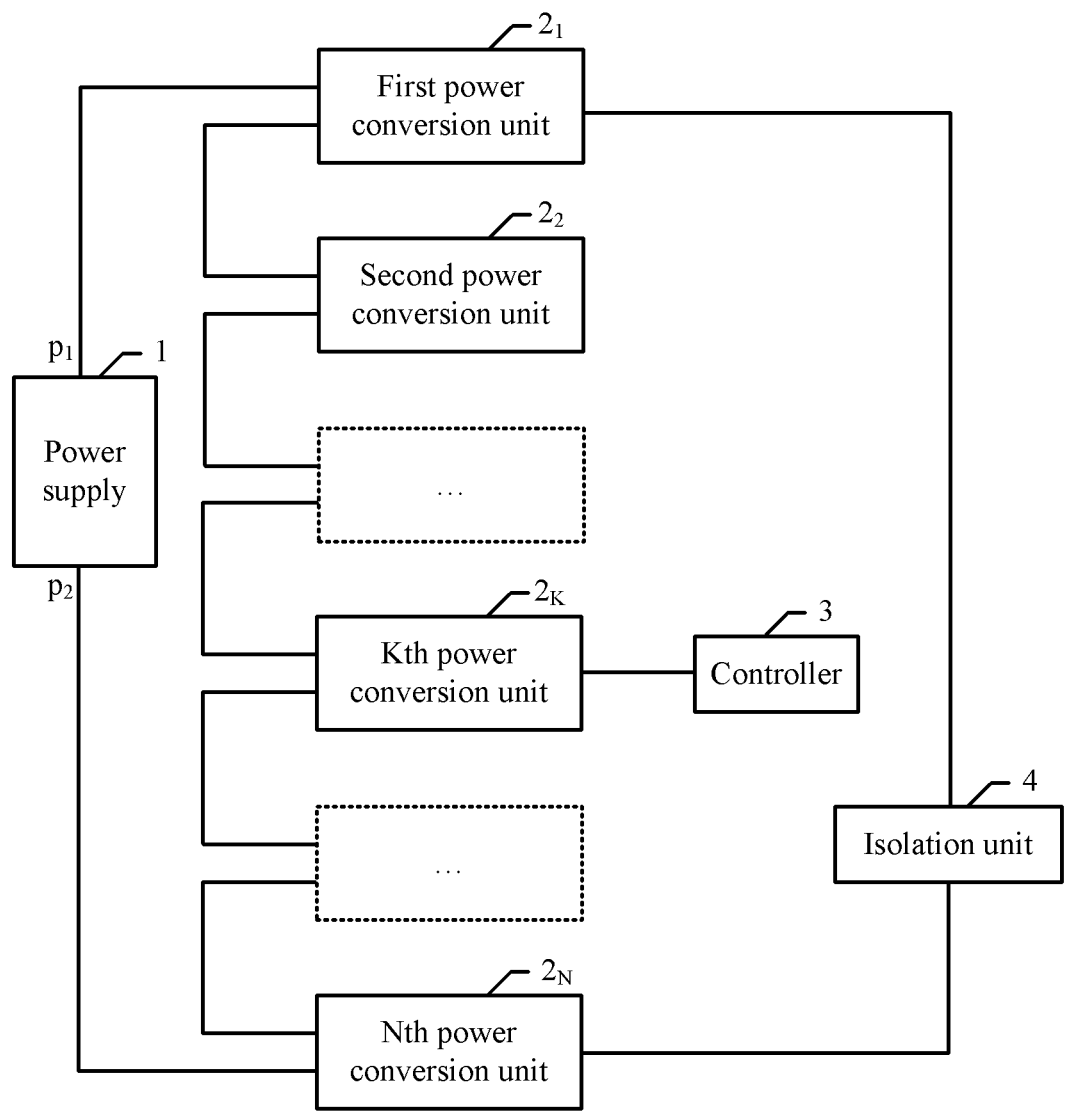
FIG. 11 is a schematic diagram of a second example cascade circuit, in accordance with embodiments of the present invention.

Referring now to FIG. 11, shown is a schematic diagram of a second example cascade circuit, in accordance with embodiments of the present invention. It should be understood that in FIGS. 1 and 2 controller 3 being connected to power conversion unit $2_1$ is taken as an example for illustration. However, particular embodiments are not limited in this regard, and controller 3 may be connected to any of the power conversion units. When controller 3 is connected to the Nth power conversion unit $2_N$, the operating process is similar to that when controller 3 is connected to power conversion unit $2_1$. When the power conversion unit connected to controller 3 is a Kth power conversion unit, K=2, 3 . . . N−1, a schematic diagram of the cascade circuit is shown in the example of FIG. 11. In this particular example, the power conversion unit connected to controller 3 is not the first power conversion unit $2_1$, which may be any one of the second to the (N−1)th power conversion units $2_2$-$2_{N-1}$. Correspondingly, isolation unit 4 can connect between the Nth power conversion unit $2_N$ and power conversion unit $2_1$.

For example, before the rectifier circuit is started, controller 3 may send the carrier phase, the carrier period, and the synchronization signal to the connected Kth power conversion unit $2_K$. In addition, the Kth power conversion unit $2_K$ may send the carrier phase, the carrier period, and the synchronization signal to the (K+1)th power conversion unit $2_{K+1}$, and so forth, until the carrier phase, the carrier period, and the synchronization signal are sent to the Nth power conversion unit $2_N$. The Nth power conversion unit $2_N$ may send the carrier phase, the carrier period, and the synchronization signal to power conversion unit $2_1$ through isolation unit 4 to realize the cyclic working of the N power conversion units with the same phase difference from one another. Similarly, the carrier phase, the carrier period, and the synchronization signal may then be sent to the next-stage power conversion unit(s) in sequence from power conversion unit $2_1$ until they are sent to the (K−1)th power conversion unit $2_{K-1}$. In this way, all the power conversion units can receive the carrier phase, the carrier period, and the synchronization signal to obtain the carrier signals based on the carrier phase, the carrier period, and the synchronization signal.

After the rectifier circuit has started, controller 3 may send modulation signal $V_s$ to the connected Kth power conversion unit $2_K$. Starting from the Kth power conversion unit $2_K$, when the power conversion unit detects that it shares the ground with the next-stage power conversion unit, it can send modulated signal $V_s$ to the next-stage power conversion unit the Nth power conversion unit $2_N$ receives modulated signal $V_s$. The Nth power conversion unit $2_N$ may send modulation signal $V_s$ to power conversion unit $2_1$ through isolation unit 4. Similarly, starting from power conversion unit $2_1$, when the power conversion unit detects that it shares the ground with the next-stage power conversion unit, it can send modulated signal $V_s$ to the next-stage power conversion unit the (K−1)th power conversion unit $2_{K-1}$ receives modulated signal $V_s$.

The phase angles of the first carrier signals of the power conversion units should be configured according to the principle of increasing sequentially along the signal transmission path, and a difference between the phase angles of the first carrier signals of adjacent power conversion units in the path is $$\frac{\pi}{N}.$$

In particular embodiments, each of the power conversion units can be controlled to send the signal to be transmitted to the next-stage power conversion unit when each power conversion unit shares the ground with the adjacent next-stage power conversion unit. As a result, only one isolation unit may be required, the number of isolation modules can be reduced, and integration of the cascade circuit facilitated.

Figure 12:
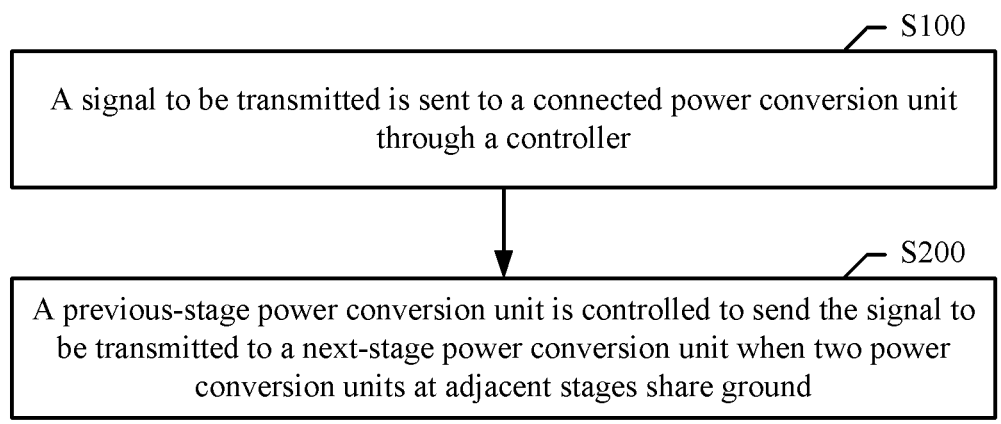
FIG. 12 is a flowchart of an example control method, in accordance with embodiments of the present invention.

Referring now to FIG. 12, shown is a flowchart of an example control method, in accordance with embodiments of the present invention. In this particular example, the control method of the cascade circuit can include, at S100, a signal to be transmitted is sent to a connected power conversion unit through a controller. At S200, a previous-stage power conversion unit can be controlled to send the signal to be transmitted to a next-stage power conversion unit when two power conversion units at adjacent stages share ground.

In particular embodiments, the signal to be transmitted can include a modulation signal. The control method can also include generating drive signals based on the modulation signal to perform power conversion. For example, generating the drive signals based on the modulation signal to perform power conversion can include controlling states of a first switch and a second switch of a first arm to be complementary, controlling states of a third switch and a fourth switch of a second arm to be complementary, whereby a phase difference between the first switch and the third switch is about 180°. In particular embodiments, in response to turning on of the fourth switch of the second arm of the previous-stage power conversion unit and the second switch of the first arm of the adjacent next-stage power conversion unit at the same time, the previous-stage power conversion unit and the adjacent next-stage power conversion unit may share the ground.

In particular embodiments, in response to a same bus voltage of the previous-stage power conversion unit and the adjacent next-stage power conversion unit and turning on of the third switch of the second arm of the previous-stage power conversion unit and the first switch of the first arm of the adjacent next-stage power conversion unit at the same time, the previous-stage power conversion unit and the adjacent next-stage power conversion unit may share the ground. In particular embodiments, generating the drive signals based on the modulation signal to perform power conversion can include generating a first carrier signal corresponding to the first arm and a second carrier signal corresponding to the second arm based on a carrier generation signal, generating drive signals of the first arm based on the modulation signal and the first carrier signal, and generating drive signals of the second arm based on the modulation signal and the second carrier signal, which can respectively control the first and second arms.

In particular embodiments, controlling the first arm and the second arm can include controlling the first switch of the first arm to be turned on and the second switch of the first arm to be turned off in response to the modulation signal being greater than the first carrier signal, controlling the first switch of the first arm to be turned off and the second switch of the first arm to be turned on in response to the modulation signal being smaller than the first carrier signal, controlling the third switch of the second arm to be turned off and the fourth switch of the second arm to be turned on in response to the modulation signal being greater than the second carrier signal, and controlling the third switch of the second arm to be turned on and the fourth switch of the second arm to be turned off in response to the modulation signal being smaller than the second carrier signal.

In particular embodiments, generating the first carrier signal corresponding to the first arm and the second carrier signal corresponding to the second arm based on the carrier generation signal can include receiving the carrier generation signal before power conversion is performed, the carrier generation signal including a carrier phase, a carrier period, and a synchronization signal, and generating the first carrier signal based on the carrier generation signal; and phase-shifting the first carrier signal to generate the second carrier signal, in which a phase difference between the first and second carrier signals is 180°.

In particular embodiments, controlling the previous-stage power conversion unit to send the signal to be transmitted to the next-stage power conversion unit when the two power conversion units at adjacent stages share the ground can include outputting an active communication enable signal when the previous-stage power conversion unit shares the ground with the adjacent next-stage power conversion unit so as to control a signal sending circuit of the previous-stage power conversion unit to send the signal to be transmitted to the next-stage power conversion unit. For example, outputting the active communication enable signal can include outputting a first comparison result based on the modulation signal and the second carrier signal of the previous-stage power conversion unit, outputting a second comparison result based on the modulation signal and the first carrier signal of the next-stage power conversion unit, and generating the communication enable signal based on the first and second comparison results.

In particular embodiments, the first carrier signal of the next-stage power conversion unit is generated through phase-shifting the first carrier signal of the previous-stage power conversion unit by $$\frac{\pi}{N},$$

or may be obtained from a signal output by the first carrier signal generating circuit of the next-stage power conversion unit. In particular embodiments, each of the power conversion units can be controlled to send the signal to be transmitted to the next-stage power conversion unit when each power conversion unit shares the ground with the adjacent next-stage power conversion unit. As a result, only one isolation unit may be required to decrease the number of the isolation modules, which can facilitate integration of the cascade circuit.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A cascade circuit, comprising:
   a) N power conversion units connected in series between two ports of a power supply, wherein N is a positive integer greater than or equal to 2;
   b) a controller connected to one of the N power conversion units, and being configured to send a signal to be transmitted through the connected power conversion unit;
   c) wherein each of the power conversion units is configured to send the signal to be transmitted to a next-stage power conversion unit when the each of the power conversion unit shares a reference voltage with the adjacent next-stage power conversion unit; and
   d) wherein the signal to be transmitted is controlled to be transmitted from a previous-stage power conversion unit to a next-stage power conversion unit in sequence until the signal to be transmitted is received by all of the N power conversion units.

2. The cascade circuit of claim 1, wherein the signal to be transmitted comprises a modulation signal, and each power conversion unit is configured to generate drive signals based on the modulation signal to perform power conversion.

3. The cascade circuit of claim 2, wherein each power conversion unit comprises:
   a) a first arm comprising a first switch and a second switch connected in series between a bus of a current power conversion unit and a reference voltage;
   b) a second arm connected in parallel with the first arm comprising a third switch and a fourth switch connected in series between the bus of the current power conversion unit and the reference voltage; and
   c) wherein a midpoint of the first arm of a first power conversion unit is connected to a first port of the power supply, a midpoint of the first arm of each of the other power conversion units is connected to a midpoint of the second arm of a previous-stage power conversion unit, a midpoint of the second arm of an Nth power conversion unit is connected to a second port of the power supply, and a midpoint of each arms being a common connection point of switches in the each of the arms.

4. The cascade circuit of claim 3, wherein states of the first switch and the second switch are complementary, states of the third switch and the fourth switch are complementary, and a phase difference between the first switch and the third switch is 180°.

5. The cascade circuit of claim 3, wherein in response to turning on of the fourth switch of the second arm of the current power conversion unit and the second switch of the first arm of the adjacent next-stage power conversion unit simultaneously, the current power conversion unit and the adjacent next-stage power conversion unit share the reference voltage.

6. The cascade circuit of claim 3, wherein in response to a same bus voltage of the current power conversion unit and the adjacent next-stage power conversion unit and turning on the third switch of the second arm of the current power conversion unit and the first switch of the first arm of the adjacent next-stage power conversion unit simultaneously, the current power conversion unit and the adjacent next-stage power conversion unit share the reference voltage.

7. The cascade circuit of claim 3, wherein the first switch is turned on and the second switch is turned off when the modulation signal is greater than a first carrier signal, the first switch is turned off and the second switch is turned on when the modulation signal is smaller than the first carrier signal, the third switch is turned on and the fourth switch is turned off when the modulation signal is smaller than a second carrier signal, and the third switch is turned off and the fourth switch is turned on when the modulation signal is greater than the second carrier signal.

8. The cascade circuit of claim 3, wherein each power conversion unit further comprises a communication and drive circuit having:
   a) a signal receiving circuit configured to receive the signal to be transmitted;
   b) a carrier signal generating circuit configured to generate a first carrier signal corresponding to the first arm of the current power conversion unit and a second carrier signal corresponding to the second arm of the current power conversion unit based on a carrier generation signal;
   c) a drive signal generating circuit configured to generate drive signals of the first arm based on the modulation signal and the first carrier signal and drive signals of the second arm based on the modulation signal and the second carrier signal to be respectively configured to control the first arm and the second arm; and
   d) a signal sending circuit configured to send the signal to be transmitted.

9. The cascade circuit of claim 8, wherein the carrier signal generating circuit comprises:
   a) a first carrier signal generating circuit configured to generate the first carrier signal based on the carrier generation signal; and b) a first phase shifting circuit configured to phase-shift the first carrier signal so as to generate the second carrier signal, wherein a phase difference between the second carrier signal and the first carrier signal is 180°.

10. The cascade circuit of claim 9, wherein the first carrier signal generating circuit is configured to receive the carrier generation signal for generating carrier signals of the current power conversion unit before power conversion is performed, wherein the carrier generation signal comprises a carrier phase, a carrier period, and a synchronization signal.

11. The cascade circuit of claim 8, wherein the communication and drive circuit further comprises a communication enable signal generating circuit configured to output a communication enable signal that is active when the current power conversion unit shares the reference voltage with the adjacent next-stage power conversion unit, so as to control the signal sending circuit of the current power conversion unit to send the signal to be transmitted to the next-stage power conversion unit.

12. The cascade circuit of claim 11, wherein the communication enable signal generating circuit comprises:
   a) a first comparator configured to output a first comparison result based on the modulation signal and the second carrier signal of the current power conversion unit;
   b) a second comparator configured to output a second comparison result based on the modulation signal and the first carrier signal of the next-stage power conversion unit; and
   c) a logic circuit configured to generate the communication enable signal based on the first comparison result and the second comparison result.

13. The cascade circuit of claim 12, wherein the first carrier signal of the next-stage power conversion unit received by the second comparator is generated through phase-shifting the first carrier signal of the current power conversion unit by $$\frac{\pi}{N},$$

or is obtained from a signal output by the first carrier signal generating circuit of the next-stage power conversion unit.

14. The cascade circuit of claim 1, wherein the cascade circuit further comprises an isolation unit connected between an Nth power conversion unit and a first power conversion unit and being configured to isolate signals between the Nth power conversion unit and the first power conversion unit.

15. The cascade circuit of claim 14, wherein when the first power conversion unit is connected to the controller, an output terminal of the isolation unit is connected to the first power conversion unit through the controller, when the Nth power conversion unit is connected to the controller, the output terminal of the isolation unit is connected to the Nth power conversion unit through the controller.

16. The cascade circuit of claim 14, wherein when a Kth power conversion unit is connected to the controller, an output terminal of the isolation unit is connected to the first power conversion unit, and the signal to be transmitted output by the Nth power conversion unit is transmitted to the first power conversion unit through the isolation unit, wherein K is a positive integer, 1<K<N.

17. A method of controlling a cascade circuit having N power conversion units connected in series between two ports of a power supply, wherein N is a positive integer greater than or equal to 2, the method comprising:
   a) sending a signal to be transmitted to a connected power conversion unit through a controller;
   b) controlling a previous-stage power conversion unit to send the signal to be transmitted to a next-stage power conversion unit when two power conversion units at adjacent stages share a reference voltage; and
   c) wherein the signal to be transmitted is controlled to be transmitted from a previous-stage power conversion unit to a next-stage power conversion unit in sequence until the signal to be transmitted is received by all power conversion units.

18. The method of claim 17, further comprising generating drive signals based on a modulation signal to perform power conversion, wherein the signal to be transmitted comprises the modulation signal.

19. The method of claim 18, wherein generating the drive signals based on the modulation signal to perform power conversion comprises controlling states of a first switch and a second switch of a first arm to be complementary, and controlling states of a third switch and a fourth switch of a second arm to be complementary, wherein a phase difference between the first switch and the third switch being 180°.

20. The method of claim 19, wherein in response to turning on of the fourth switch of the second arm of the previous-stage power conversion unit and the second switch of the first arm of the adjacent next-stage power conversion unit at the same time, the previous-stage power conversion unit and the adjacent next-stage power conversion unit share the reference voltage.

* * * * *